(12) United States Patent
Mukai et al.

(10) Patent No.: US 9,667,924 B2
(45) Date of Patent: May 30, 2017

(54) PROJECTION-TYPE IMAGE DISPLAY DEVICE

(71) Applicant: Panasonic Intellectual Property Management Co., Ltd., Osaka (JP)

(72) Inventors: Kazuo Mukai, Kyoto (JP); Takahiro Takemori, Osaka (JP); Masutaka Inoue, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/854,791

(22) Filed: Sep. 15, 2015

(65) Prior Publication Data

US 2016/0006996 A1    Jan. 7, 2016

Related U.S. Application Data

(63) Continuation of application No. PCT/JP2014/002203, filed on Apr. 18, 2014.

(30) Foreign Application Priority Data

| Apr. 18, 2013 | (JP) | 2013-087161 |
| Jul. 4, 2013 | (JP) | 2013-140453 |
| Nov. 5, 2013 | (JP) | 2013-229155 |

(51) Int. Cl.
*H04N 9/31* (2006.01)
*G03B 21/14* (2006.01)
(Continued)

(52) U.S. Cl.
CPC ......... *H04N 9/3141* (2013.01); *G03B 21/005* (2013.01); *G03B 21/145* (2013.01);
(Continued)

(58) Field of Classification Search
CPC ........ G03B 21/10; G03B 21/26; G03B 21/28; G03B 21/145
See application file for complete search history.

(56) References Cited

U.S. PATENT DOCUMENTS 5,551,658 A * 9/1996 Dittmer ................ G03B 21/00
248/329
6,783,252 B1 * 8/2004 Cambron ............... G03B 21/26
348/E5.137
(Continued)

FOREIGN PATENT DOCUMENTS

| JP | 10-039269 A | 2/1998 |
| JP | 11-102161 A | 4/1999 |

(Continued)

OTHER PUBLICATIONS

International Preliminary Report on Patentability for corresponding International Application No. PCT/JP2014/002203 mailed Oct. 20, 2015.
(Continued)

*Primary Examiner* — Sultan Chowdhury
(74) *Attorney, Agent, or Firm* — Renner, Otto, Boisselle & Sklar, LLP

(57) ABSTRACT

A projection-type image display device includes a first housing and a second housing. The first housing houses a light source unit configured to emit light, an image generating unit configured to modulate the light from the light source unit according to a video input signal to generate image light, and a projecting unit configured to project the image light generated by the image generating unit. The second housing includes an output unit configured to output a light signal and/or an input unit configured to input a light signal which are/is exposed and arranged on a surface of the second housing.

8 Claims, 13 Drawing Sheets

(51) Int. Cl.
*G03B 21/20* (2006.01)
*G03B 33/06* (2006.01)
*G09F 19/18* (2006.01)
*G09F 19/22* (2006.01)
*G03B 21/00* (2006.01)

(52) U.S. Cl.
CPC ....... *G03B 21/204* (2013.01); *G03B 21/2066* (2013.01); *G03B 33/06* (2013.01); *G09F 19/18* (2013.01); *G09F 19/22* (2013.01); *G09F 19/228* (2013.01)

(56) References Cited

U.S. PATENT DOCUMENTS

| | | | | |
|---|---|---|---|---|
| 2008/0049192 | A1* | 2/2008 | Nozaki | G03B 17/00 |
| | | | | 353/25 |
| 2011/0188008 | A1* | 8/2011 | Maeda | G03B 21/28 |
| | | | | 353/85 |
| 2012/0293777 | A1* | 11/2012 | Kase | G03B 21/145 |
| | | | | 353/85 |
| 2013/0050658 | A1* | 2/2013 | Morohoshi | G03B 21/16 |
| | | | | 353/57 |

FOREIGN PATENT DOCUMENTS

| | | |
|---|---|---|
| JP | 2003-084362 A | 3/2003 |
| JP | 2004-094100 A | 3/2004 |
| JP | 2005-099588 A | 4/2005 |
| JP | 2006-285059 A | 10/2006 |
| JP | 2008-185757 A | 8/2008 |
| JP | 2010-200223 A | 9/2010 |
| JP | 2011-170279 A | 9/2011 |
| JP | 2013-015750 A | 1/2013 |
| JP | 2013-061515 A | 4/2013 |

OTHER PUBLICATIONS

International Search Report for corresponding International Application No. PCT/JP2014/002203 mailed Jul. 15, 2014.

* cited by examiner

_US 9,667,924 B2_

PROJECTION-TYPE IMAGE DISPLAY DEVICE

CROSS-REFERENCE TO RELATED APPLICATIONS

This is a continuation application of International Application No. PCT/JP2014/002203 with an international filing date of Apr. 18, 2014, which claims priority of Japanese Patent Application Nos. 2013-087161 filed on Apr. 18, 2013; 2013-140453 filed on Jul. 4, 2013; 2013-229155 filed on Nov. 5, 2013, the contents of which are incorporated herein by reference.

BACKGROUND

1. Technical Field

The present disclosure relates to a projection type image display device provided with a housing including a light source and with a support portion rotatably supporting the housing.

2. Related Art

Today a projector is widely prevalent as a projection type image display device that magnifies and projects various images, and so on, on a screen.

The projector modulates light emitted from a light source according to a video signal, by means of a spatial light modulator such as a digital micromirror device (DMD) or a liquid-crystal display element, to project the modulated light on the screen.

Various projectors have also been developed that are disposed on a ceiling to project images on a floor or a wall surface. The projectors disposed for use on the ceiling entail various problems to be studied, such as necessity for dedicated holders or wiring works, storage method, device size reduction, easiness in work, ease of use, and aesthetic sense.

In view of these problems, for example, Japanese Laid-Open Patent Publication No. 2008-185757 proposes a projection type image display device having a connector which is attachable to a wiring fixture for illumination and having an illumination device disposed on a housing surface facing the floor.

When a projector is installed on the ceiling, the user cannot reach the projector and thus cannot operate the projector. Further since it is also difficult for the user to access the projector, it is hard for the user to check an indicator showing a status of the projector provided on the projector.

SUMMARY

The present disclosure provides a projection-type image display device improving user's convenience in operation of the display device and confirmation of status of the display device.

A first projection-type image display device of the present disclosure includes a first housing and a second housing. The first housing houses a light source unit configured to emit light, an image generating unit configured to modulate the light from the light source unit according to a video input signal to generate image light, and a projecting unit configured to project the image light generated by the image generating unit. The second housing includes an output unit configured to output a light signal and/or an input unit configured to input a light signal which are/is exposed and arranged on a surface of the second housing.

A second projection-type image display device of the present disclosure includes a first housing and a second housing. The first housing houses a light source unit configured to emit light, an image generating unit configured to modulate the light from the light source unit according to a video input signal to generate image light, and a projecting unit configured to project the image light generated by the image generating unit. The second housing includes a receiving unit configured to receive a signal indicative of an instruction by a user.

A third projection-type image display device of the present disclosure includes a first housing and a second housing. The first housing houses a light source unit configured to emit light, an image generating unit configured to modulate the light from the light source unit according to a video input signal to generate image light, and a projecting unit configured to project the image light generated by the image generating unit. The second housing includes an informing unit configured to inform a user of an internal state of the projection-type image display device.

According to the present disclosure, in the projection-type image display device, an output unit for a light signal (e.g., light signal indicating the status of the device) is disposed at a position easily viewable from a user and an output unit for light signal (e.g., a remote control signal for operation) is disposed at a position where the projection-type image display device can easily receive the light signal. This enables the provision of a projection-type image display device having improved user convenience in the device operation and device status check.

DETAILED DESCRIPTION OF THE EMBODIMENTS

Embodiments will hereinafter be described in detail with proper reference to the drawings. Note however that excessively detailed description may be omitted. For example, detailed description of already well-known matters and repeated description of substantially the same configuration may be omitted. This is for the purpose of preventing the following description from becoming unnecessarily redundant, to facilitate the understanding of those skilled in the art.

The inventors provide the accompanying drawings and the following description in order for those skilled in the art to fully understand the present disclosure and it is not intended to limit the subject matters defined in the claims by them.

First Embodiment

1. Outline of Projection-Type Image Display Device

Figure 1:
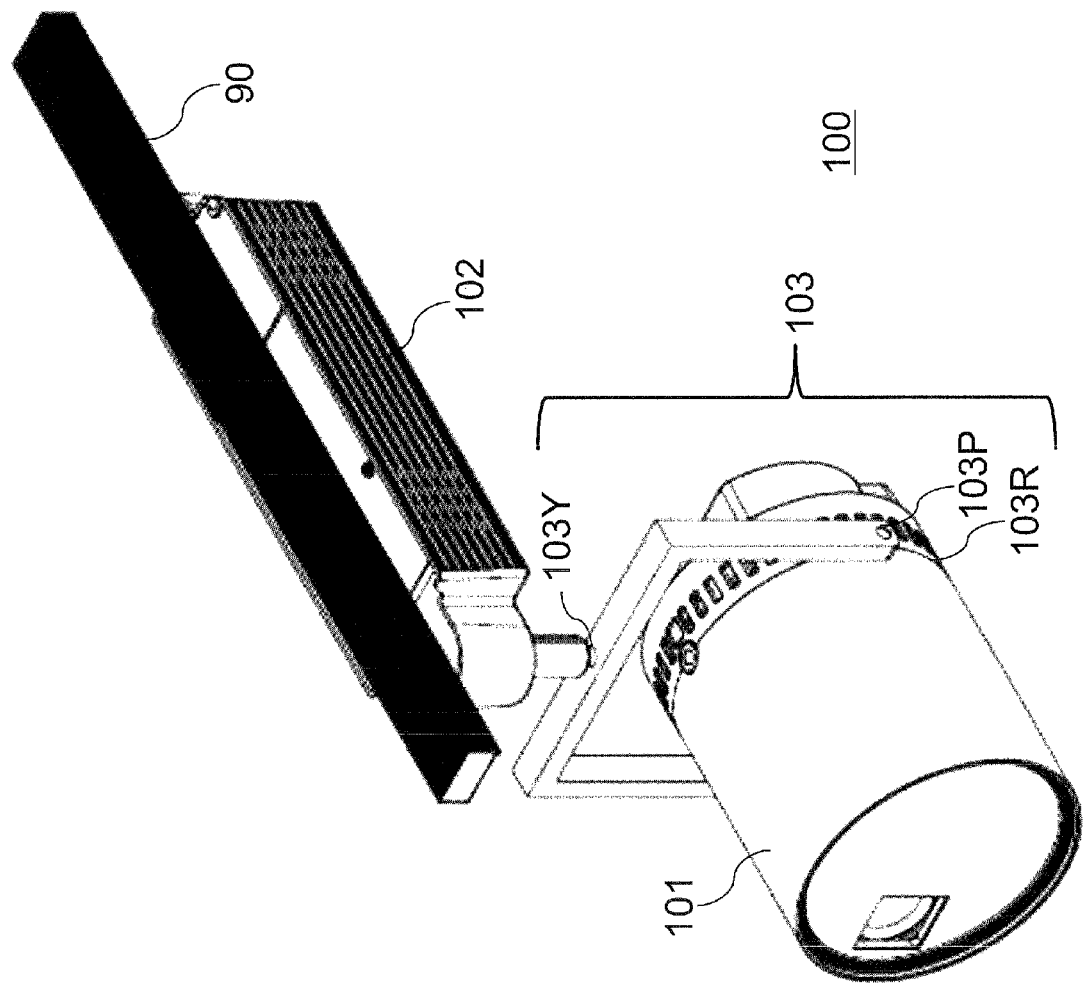
FIG. 1 is a perspective view of a projection-type image display device according to the present disclosure.
Figure 2:
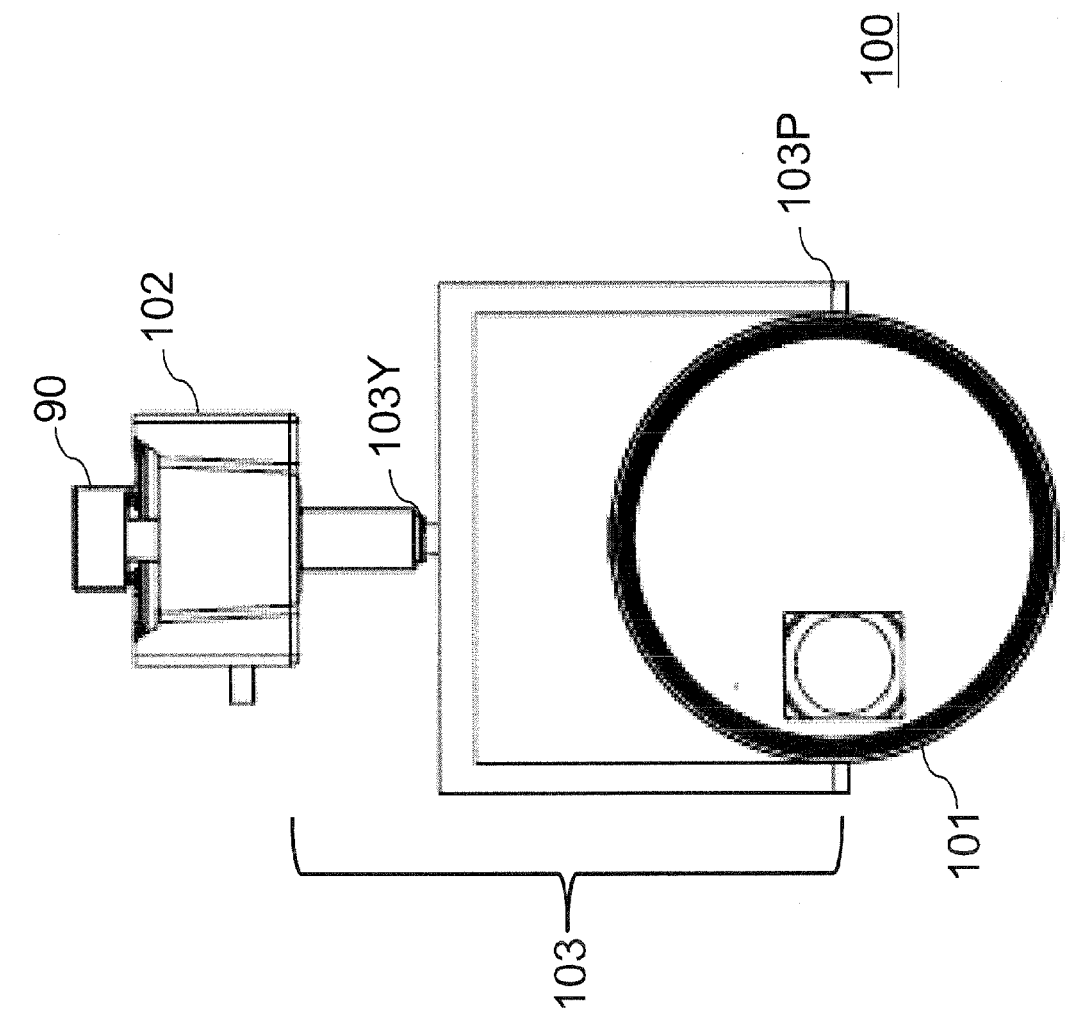
FIG. 2 is a front view of the projection-type image display device according to the present disclosure.
Figure 3:
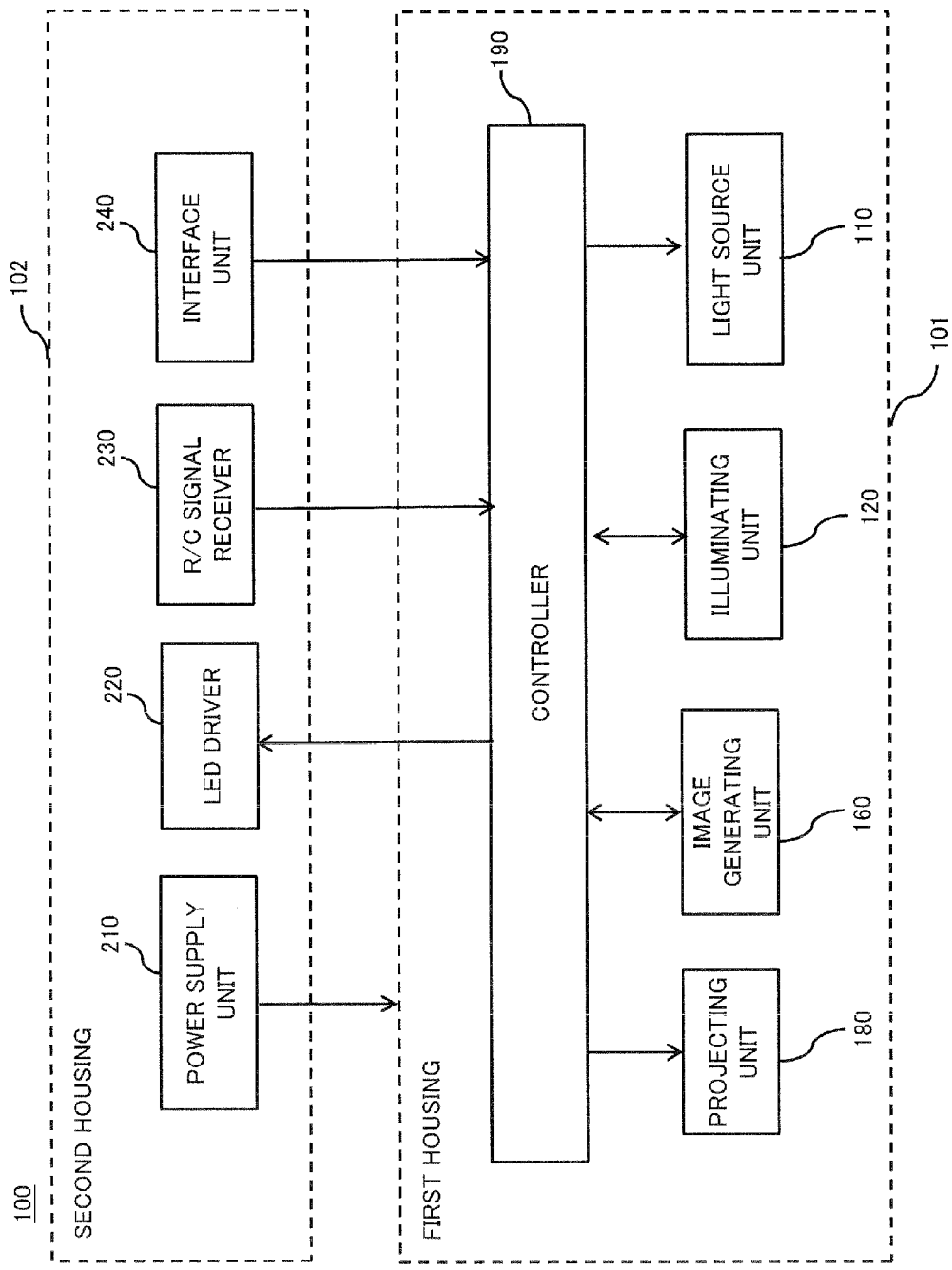
FIG. 3 is a block diagram showing a configuration of the projection-type image display device according to the present disclosure.

A projection-type image display device will be described below with reference to the drawings. FIG. 1 is a perspective view of a projection-type image display device. FIG. 2 is a front view of the projection-type image display device. FIG. 3 is a block diagram showing a configuration of the projection-type image display device.

As shown in FIGS. 1 and 2, a projection-type image display device 100 has a first housing 101 that mainly houses optical members therein and a second housing 102 that mainly houses a power supply unit (power supply board) therein. The second housing 102 is connectable to a wiring duct rail 90 for illumination. The first housing 101 and the second housing 102 are connected by a joint unit 103 that is rotatable around three mutually independent axes. The joint unit 103 includes a first joint 103Y, a second joint 103P, and a third joint 103R. The first joint 103Y enables horizontal rotation (yawing) of the first housing 101 around a vertical axis. The second joint 103P enables up-and-down swinging (pitching) of the first housing 101 around a horizontal axis. The third joint 103R enables circumferential rotation (rolling) of the first housing 101 around a center line (center axis) of a cylinder of the first housing 101 having a substantially cylindrical shape.

As shown in FIG. 3, the projection-type image display device 100 has, in the first housing 101, a light source unit 110 that emits light, an image generating unit 160 that modulates the light from the light source unit 110 according to a video input signal to generate image light, an illuminating unit 120 that guides the light from the light source unit 110 to the image generating unit 160, a projecting unit 180 that projects the image light generated by the image generating unit 160 onto a screen (not shown), and a controller 190 that controls the light source unit 110, the illuminating unit 120, the image generating unit 160, etc.

The light source unit 110 of the present disclosure has a semiconductor laser element which emits light, as excitation light to excite fluorescent substance to emit light. The illuminating unit (illumination optical system) 120 includes optical members such as various lenses, mirrors, and rods to guide the light emitted from the light source unit 110 to illuminate the image generating unit 160. The image generating unit 160 uses elements such as a digital micromirror device (hereinafter, referred to as "DMD") and a liquid-crystal panel to spatially modulate light according to a video signal. The projecting unit 180 includes optical members such as lenses and mirrors, to magnify and project the light spatially modulated by the image generating unit 160.

The projection-type image display device 100 has, in the second housing 102, a power supply unit 210, an LED driving unit 220, a remote-control (R/C) signal receiver 230, and an interface unit 240 including a terminal for audio output and a terminal for interface. The power supply unit 210 has a power supply circuit that receives a voltage from the wiring duct rail 90 to convert it into a desired voltage, supplying electric power to units of the projection-type image display device 100. The LED driver 220 includes a plurality of LEDs and a driving circuit driving each LED. The LED driver 220 is controlled by the controller 190 of the first housing 101. The remote-control signal receiver 230 receives an operation signal from a remote controller for user's operation remotely performed, and transmits the received operation signal to the controller 190. The interface unit 240 includes a terminal for output audio signal and a terminal for data communication in conformity with a predetermined interface standard (details will be described later).

2. Internal Configuration of First Housing

The internal configuration of the first housing 101 of the projection type image display device according to the present disclosure will be described with reference to FIG. 4.

Figure 4:
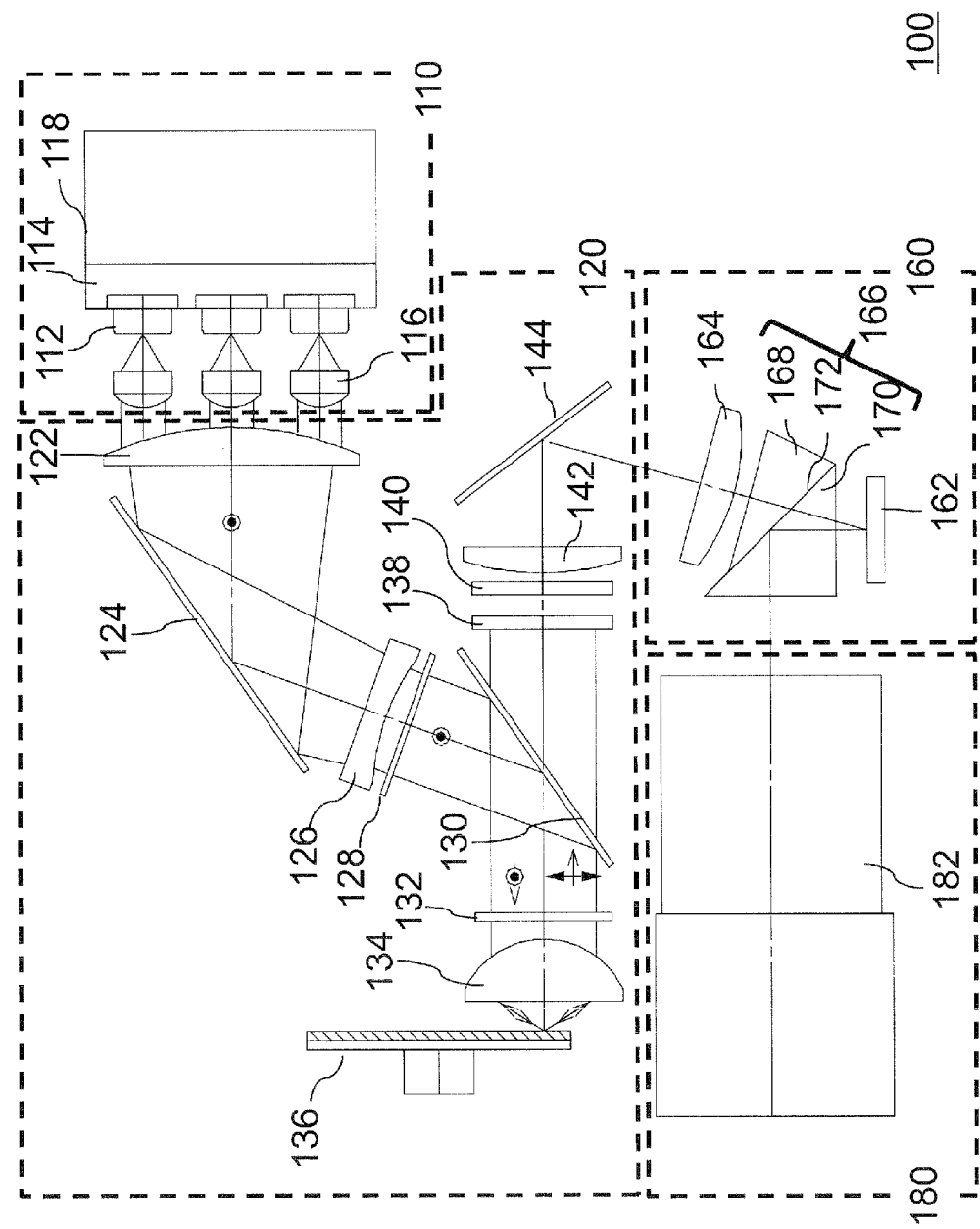
FIG. 4 is a view explaining an optical configuration of the projection-type image display device according to the present disclosure.

FIG. 4 is a view explaining the optical configuration of the projection type image display device 100. As shown in FIG. 4, the projection type image display device 100 includes the light source unit 110, the image generating unit 160 that generates image light according to a video input signal, the illuminating unit 120 that guides the light from the light source unit 110 to the image generating unit 160, and the projecting unit 180 that projects the image light generated by the image generating unit 160 onto a screen (not shown).

The light source unit 110 includes twelve semiconductor laser elements 112 arranged on a radiator plate 114 at certain intervals and two dimensionally in three rows and four columns, with each of lenses 116 facing each of the semiconductor laser elements 112. The lenses 116 condense light emitted from the corresponding semiconductor laser elements 112 into parallel light.

A heat sink 118 is disposed at the back of the radiator plate 114. The heat sink 118 is a device for cooling the semiconductor laser elements 112. The semiconductor laser elements 112 emit linearly polarized blue color light with a wavelength width of 440 nm to 455 nm. The semiconductor laser elements 112 are arranged such that the polarization direction of light emitted from each laser element 112 is s-polarization with respect to the plane of incidence of a dichroic mirror 130.

The light emitted from the light source unit 110 enters a convex lens 122 and is condensed (reduced in diameter) by the convex lens 122, to be incident on a mirror 124. The mirror 124 changes the optical path to make the light from the convex lens 122 enter a concave lens 126. The mirror 124 is oriented with a predetermined angle (i.e., 55°) with respect to a principal ray of light outgoing from the lens 122. This causes the light to enter the dichromic mirror 130 at a predetermined angle (55°). The light of which optical path is changed enters a plano-concave lens 126 and is again converted to a parallel light. The light converted to parallel light enters the dichromic mirror 130 through a diffuser 128. The diffuser 128 has a function of reducing the coherence while keeping the polarization property.

The dichroic mirror 130 is disposed on the optical path to cause the light to enter and leave the dichroic surface at the predetermined incident angle (55°). The light reflected by the dichroic mirror 130 enters a λ/4 plate 132 to be converted into circularly polarized light. The circularly polarized light is condensed by the lens 134 to be irradiated on a fluorescent wheel 136 with a spot diameter of 1 to 2 mm. The fluorescent wheel 136 includes an aluminum flat plate and is divided into a region B as an area of a diffuse reflecting surface, a region G that is coated with a fluorescent substance emitting green color light, and a region R that is coated with fluorescent substance emitting red color light.

The light irradiated on the fluorescent wheel 136 is reflected intactly on the region B, whereas blue color light is converted into green color light and red color light in the region G and the region R, respectively, with the converted color light being emitted toward the lens 134. The color light is again converted into parallel light by the lens 134 to enter the λ/4 plate 132. By again passing through the λ/4 plate 132, the blue color light is converted into p-polarized light to enter the dichroic mirror 130. The green and red color light converted by the fluorescent substance also enter the dichroic mirror 130. The dichroic mirror 130 has characteristics, for light with 440 nm to 445 nm in wavelength, of transmitting about 94% or more p-polarized light and reflecting s-polarized light at a high reflectance of 98% or more. Due to such characteristics, the blue color light incident on the dichroic mirror 130 via the diffuser 128 is reflected by the dichroic mirror 130, whereas the blue color light incident from the λ/4 plate 132 passes through the dichroic mirror 130. Thus, all the color lights incident from the λ/4 plate 132 pass through the dichroic mirror 130. As a result, the blue, green, and red color lights are emitted in a time-shared way.

The blue, green, or red color lights passing through the dichroic mirror 130 enters a pair of fly-eye lenses 138 and 140 composed of a plurality of lens elements. Light flux incident on the first fly-eye lens 138 is split into multiple light fluxes. The multiple light fluxes are converged on the second fly-eye lens 140. The lens elements of the first fly-eye lens 138 have an opening shape similar to the DMD 162 of the image generating unit 160. The lens elements of the second fly-eye lens 140 have a focal length defined to satisfy a condition that the first fly-eye lens 138 and the DMD 162 have a substantially conjugate relationship. The light outgoing the second fly-eye lens 44 enters a lens 142. The lens 142 is a lens for superimposing the light outgoing from the lens elements of second fly-eye lens 140 on the DMD 162. The light leaving the lens 142 is reflected by a mirror 144 and thereafter passes through a lens 164 to enter a total reflection prism 166.

The total reflection prism 166 includes two prisms 168 and 170 with a thin air layer 172 formed on adjoining surfaces of the two prisms. The air layer 172 totally reflects light incident at an angle not less than a critical angle. The light incident on the total reflection prism 166 via the lens 164 passes through a total reflection surface to enter the DMD 162. The DMD 162 deflects the micromirrors to cause the light to enter a projection lens 182 or advance toward the outside of the effective range of the projection lens 182, according to a video signal. The light reflected by the DMD 162 enters the air layer 172 at an angle not less than the critical angle and hence reflects to be incident on the projection lens 182. Thus, the image light formed by the DMD 162 is projected on a screen (not shown).

3. Configuration of Second Housing

Figure 5A:
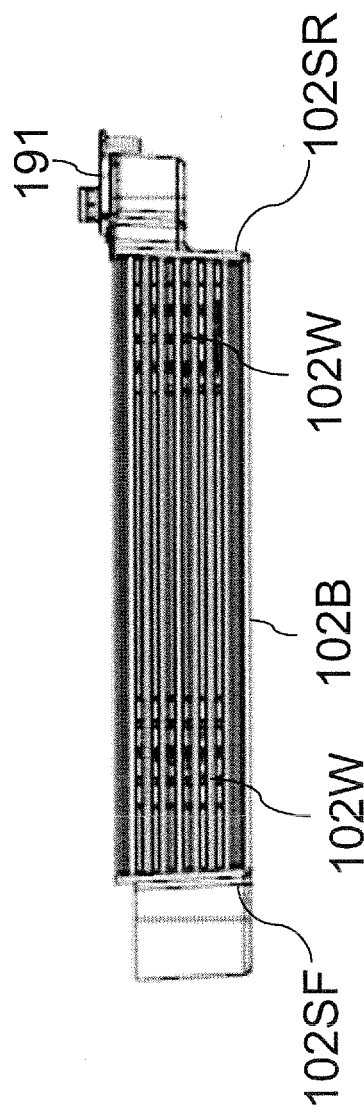
FIGS. 5A and 5B are a side view and a bottom view of a second housing of the projection-type image display device according to the present disclosure, respectively.
Figure 5B:
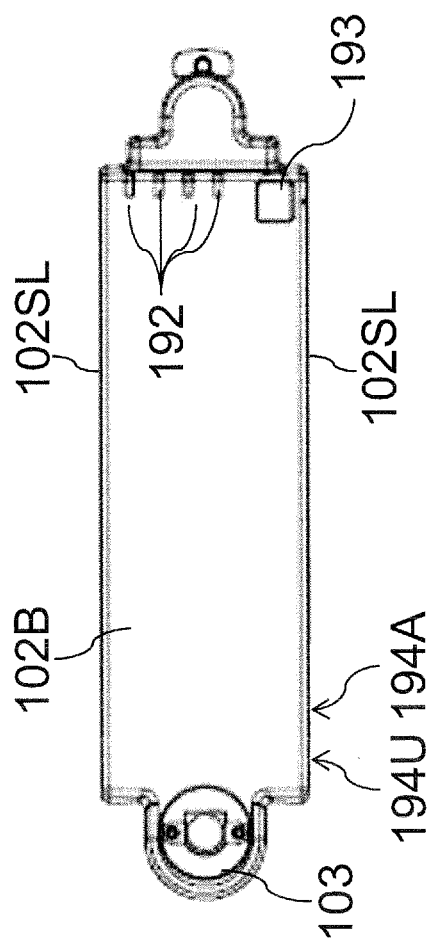
Figure 6:
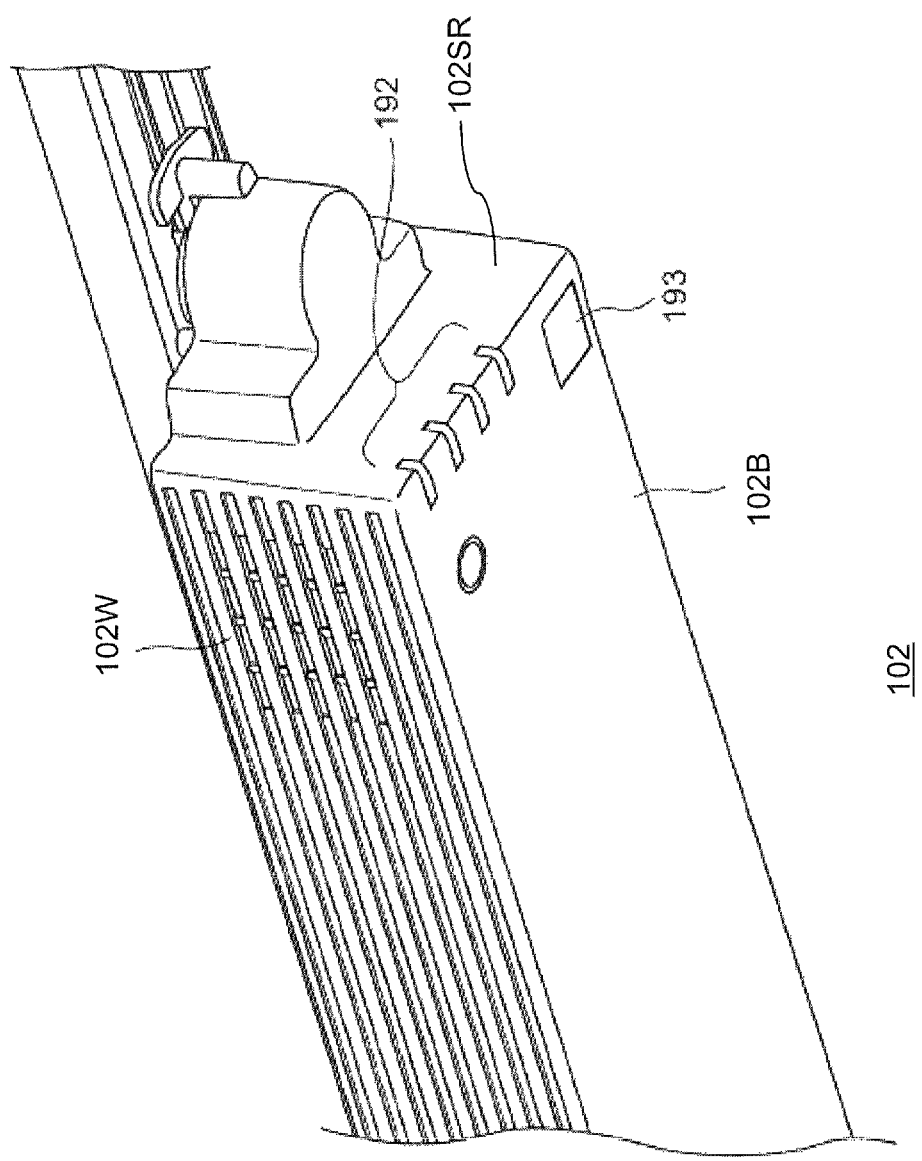
FIG. 6 is a view showing an LED and a remote-control signal receiver disposed on the second housing of the projection-type image display device.

The configuration of the second housing 102 of the projection-type image display device 100 will be described with reference to FIGS. 3, 5A-5B, and 6. FIG. 5A is a side view of the second housing 102 and FIG. 5B is a bottom view of the second housing 102. FIG. 6 is a perspective view of the second housing 102, viewed from diagonally below.

As described above, the first housing 101 mainly houses optical system components. On the other hand, as shown in FIG. 3, the second housing 102 mainly houses the power supply unit 210 that supplies electric power to the light source unit 110, the controller 190, and so on. As shown in FIG. 5A, a metal fitting 191 for attaching the second housing 102 to the wiring duct rail 90 is disposed on the top surface of the second housing 102. Electric power is supplied via this metal fitting 191 from the wiring duct rail 90 to the projection-type image display device 100. The wiring duct rail 90 is generally placed on the ceiling, or the like. The placement of the projection-type image display device 100 and the power supply wiring can be easily achieved only by attaching the metal fitting 191 to the wiring duct rail 90. The second housing 102 has a bottom surface 102B, two lateral surfaces 102SL, a front surface 102SF, and a rear surface 102SR. The first housing 101 is held below the front 102SF of the second housing 102.

As shown in FIGS. 5B and 6, at one side, in contact with the rear surface 102SR, of four sides surrounding the bottom surface 102B of the second housing 102, four LEDs 192 for information are provided, extending across the bottom surface 102B and the rear surface 102SR. The four LEDs 192 are disposed to inform the user of, respectively, 1) state of supplying electric power, i.e., the action state (active/stop/standby) of the projection-type image display device, 2) alarm on temperature abnormality in the housing, 3) alarm on light source abnormality, and 4) whether to access a recording medium. That is, the four LEDs 192 output light signals indicative of various states of the projection-type image display device 100.

The LEDs 192 are arranged extending across two surfaces, i.e., the bottom surface 102B and the rear surface 102SR, so that visibility from the user can be secured. The LEDs 192 are disposed on the second housing 102, not on the first housing 101. The direction of the first housing 101 may be changed depending on user's usage. Accordingly, if the LEDs are disposed on the first housing 101, the position of the LEDs varies in accordance with the change in the direction of the first housing 101, resulting in a poor visibility when the user checks the LED indication. Thus, the LEDs are disposed on the second housing 102 undergoing relatively less positional change, thereby improving the user's visibility.

Furthermore, on the bottom surface 102B of the second housing 102, a remote-control signal receiver 193 for receiving an operation signal from a remote controller is disposed in the vicinity of the LEDs 192. In this manner, the remote-control signal receiver 193 is also disposed, not on the first housing 101, but on the second housing 102 which is changed the position relatively less frequently. Similar to the case of the LEDs, by disposing the remote-control signal receiver on the second housing 102 having a relatively less frequency of change in position, stable reception of the operation signal from the remote controller is enabled so that the user's convenience on the remote control operation is secured. The remote control signal can be an infrared signal.

In the second housing 102, the LEDs 192 and the remote-control signal receiver 193 are arranged at an end (on the side of the rear surface 102SR) opposite to the end (on the side of the front surface 102SF) on which the joint unit 103 supporting the first housing 101 is disposed. By arranging the LEDs 192 and the remote-control signal receiver 193 at such positions, it becomes hard for the first housing 101 to intercept the optical path between the LEDs 192 or the remote-control signal receiver 193 and the user or the remote controller. Thus, the user can visually recognize the indication of the LEDs 192 more easily and the remote-control signal receiver 193 can receive a signal from the remote controller more stably.

As shown in FIGS. 5A and 6, the longitudinal lateral surfaces 102SL of the second housing 102 are disposed with a plurality of openings so that heat from the power supply unit 210 can be discharged more easily.

Figure 7:
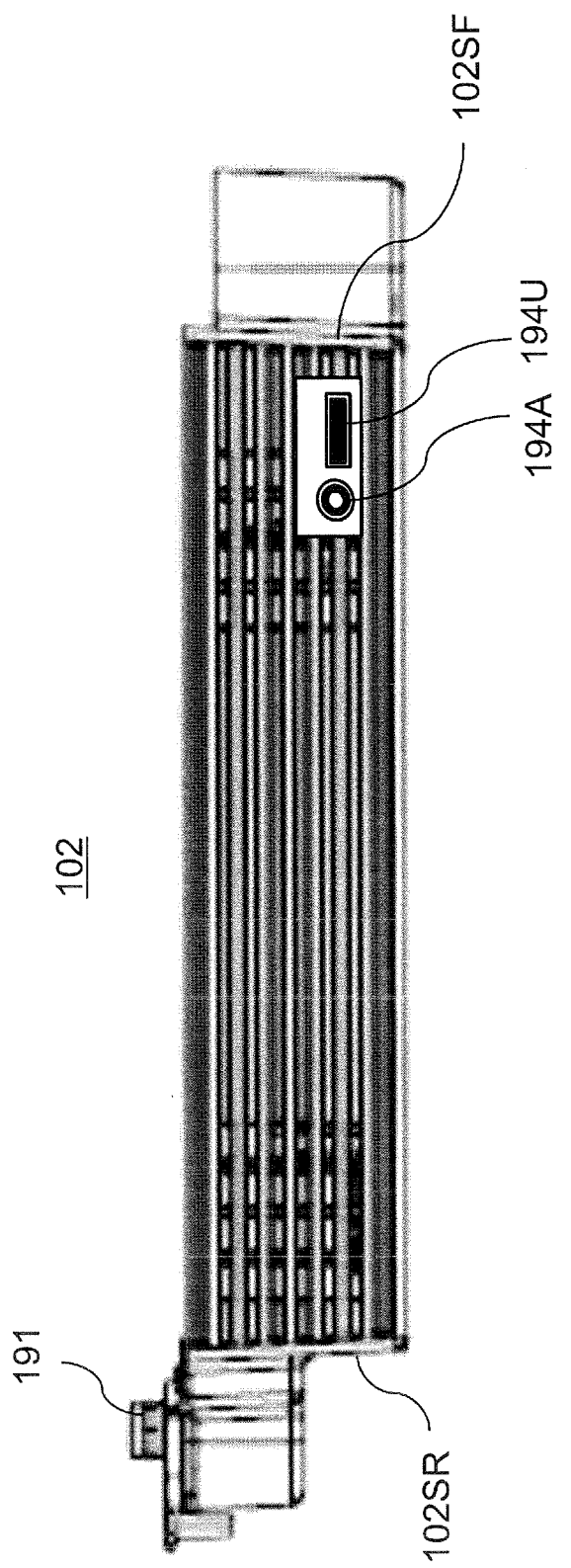
FIG. 7 is a view for explaining interface terminals disposed on a lateral surface of the second housing of the projection-type image display device according to the present disclosure.

As shown in FIGS. 5B and 7, an audio output terminal 194A and a USB terminal 194U are disposed on one of the lateral surfaces 102SL of the second housing 102. Equipment such as a loudspeaker and a Bluetooth (registered trademark) audio transmitter is connectable via the audio output terminal 194A (audio signal) and the USB terminal 194U (supply of electric power). By connecting a USB memory storing video data to the USE terminal 194U, the video data can be directly received from the USB memory.

In the second housing 102, the lateral surfaces 102SL may be provided with other interface input terminals (HDMI (registered trademark), LAN, DIGITAL, LINK, etc.), juxtaposed with the USB terminal 194U.

Figure 8:
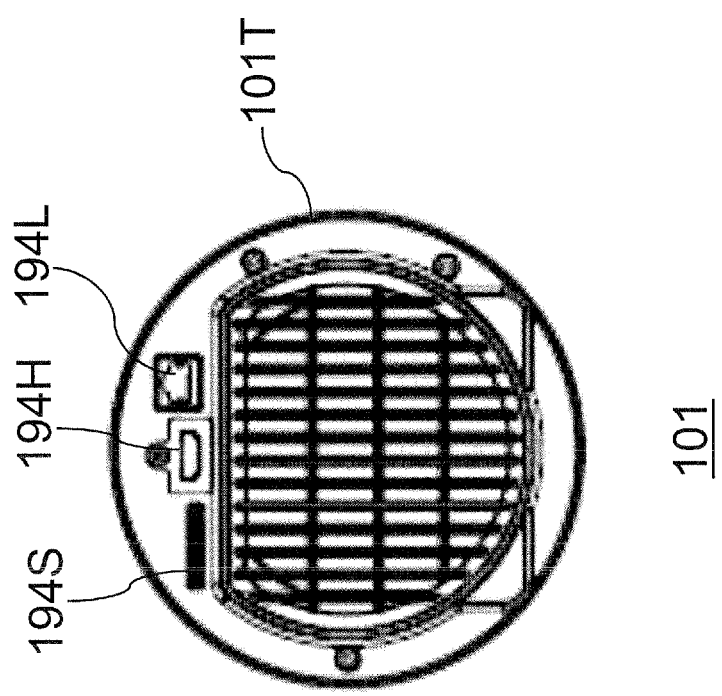
FIG. 8 is a view for explaining interface terminals disposed on a rear surface of a first housing of the projection-type image display device according to the present disclosure.

As shown in FIG. 8, the first housing 101 may be provided with various interface input terminals (HDMI (registered trademark), LAN, DIGITAL, LINK, etc.) on, for example, its rear surface 101T. In the example of FIG. 8, at the top of the rear surface 101T of the first housing 101 has, a terminal for an SD card 194S, an HDMI (registered trademark) terminal 194H, and a LAN terminal 194L. Disposition of the terminals on the first housing 101 shortens the distance from the signal source to the control board or the image generating unit 160, reducing the influence of noise. On the contrary, if the terminals are disposed on the second housing 102, the direction of the terminal position is not changed largely depending on user's usage and is fixed, thus resulting in improved user's convenience.

As described above, the projection-type image display device of the present embodiment includes the first housing 101 and the second housing 102. The first housing 101 houses the light source unit 110 that emits light, the image generating unit 160 that modulates the light from the light source unit 110 according to a video input signal to generate image light, and the projecting unit 180 that projects the image light generated by the image generating unit 160. The second housing 102 is provided with the LEDs 192 (light signal output unit) and/or the remote-control signal receiver 193 (light signal input unit) which are arranged and exposed on the surface of the second housing.

In this manner, the LEDs 192 and the remote-control signal receiver 193 are disposed in the second housing 102 having a less frequency of change in position, not on the first housing 101. This secures user's visibility of the LEDs 192 and enables the remote-control signal receiver 193 to stably receive an operation signal from the remote controller. Thus, it is possible to improve user's convenience in check of operation state and operation of the remote control of the projection-type image display device 100.

4. Use Case of Projection-Type Image Display Device

Referring to FIGS. 9 to 12, some use cases of the projection-type image display device 100 having the above configuration will be described.

(1) Use Case 1

Figure 9:
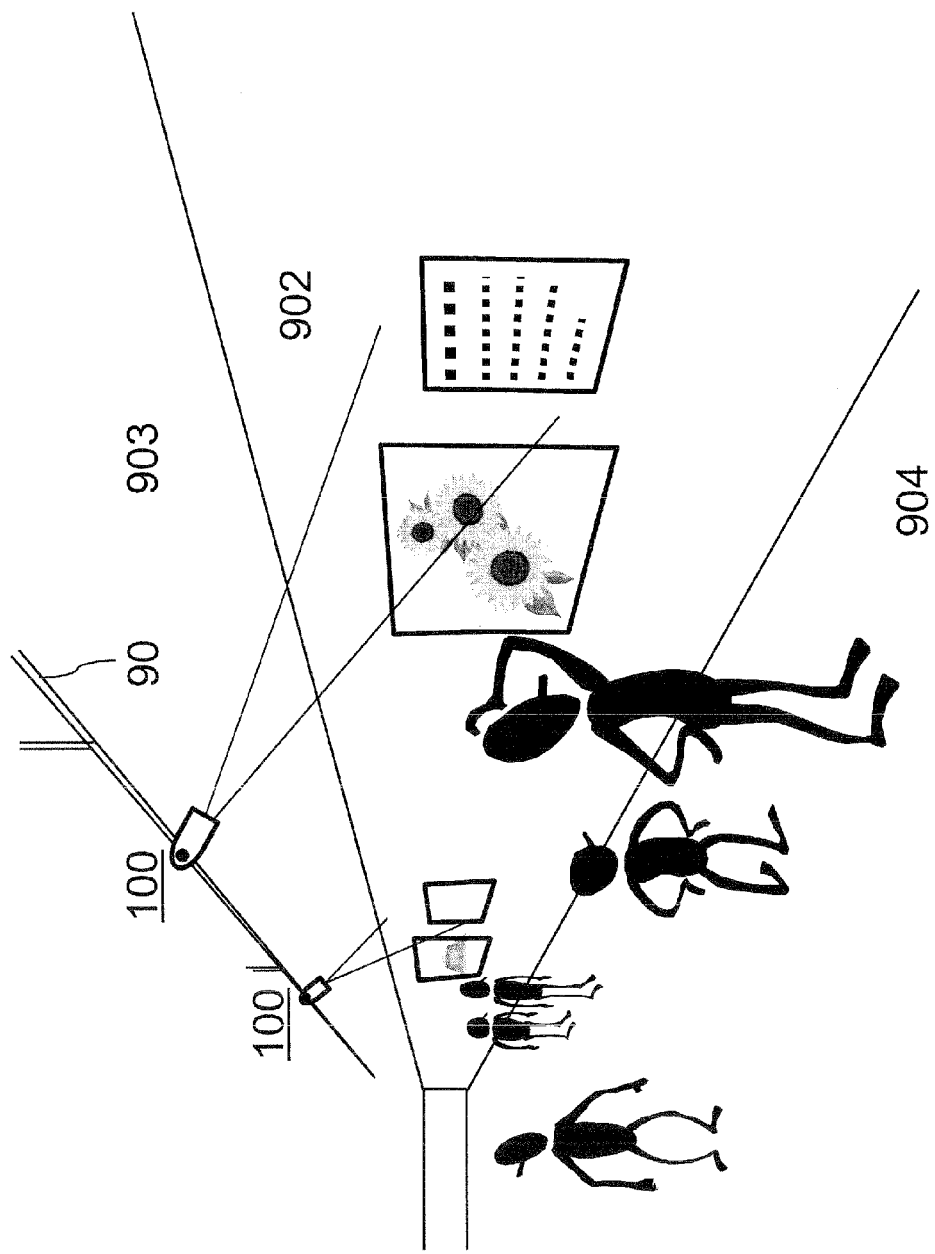
FIG. 9 is a schematic view explaining Use Case 1 of the projection-type image display device according to the present disclosure.

In an example of FIG. 9, the projection-type image display device 100 projects information (text, image) explaining exhibits and spotlight with illumination light on a wall surface 902 of an art gallery or a museum. A wiring duct rail 90 is disposed on a ceiling 903 of a projection space. A plurality of projection-type image display devices 100 are connected onto the wiring duct rail 90. Each of the projection-type image display devices 100 may be moved along the wiring duct rail 90 or may be fixed thereon.

The projection-type image display device 100 can rotate (roll) around a vertical axis and swing through 180 degrees around a horizontal axis (in this case, an axis parallel to the longitudinal direction of the wiring duct rail 90). By adjusting rotation angles relative to the respective rotational axes, projection is enabled onto the wall surface 902 or a floor surface 904. The position or the projection angle of the projection-type image display device 100 is manually adjustable by the user.

The projection-type image display device 100 is connectable to an external storage device (e.g., a USB memory), and reads and displays video data stored in the external storage device. Various video displays can be implemented, by storing desired data in the external storage device and connecting the external storage device to the projection-type image display device 100. The projection light quantity, the projection shape, and the projection distortion correction are adjustable by external control signals such as infrared rays from a remote controller.

The projection-type image display device 100 may be connected, not only to the wiring duct rail 90, but also to a curtain rail. Alternatively, a dedicated rail may be disposed on the ceiling 903 without using an existing rail and the projection-type image display device 100 may be connected to the dedicated rail. A rail may be mounted on a wall surface and the projection-type image display device 100 may be placed on the wall surface to project explanations onto the floor surface. This is effective in the case of sculptures around which there are no projection surfaces.

To control the projecting direction or the posture of the projection-type image display device 100, a motor may be provided at a connection portion to the wiring duct rail 90 so that the motor is driven by an external signal to control the position or the projection angle. This enables user's time and labor of a user placing the display device 100 to be saved.

For updating of images to be displayed, video data stored in the projection-type image display device 100 may be updated using the wiring duct rail 90, after the projection-type image display device 100 is connected to an external video generating device (e.g., PC) via a cable. Alternatively, the projection-type image display device 100 may receive and display video data from the video generating device via the cable. The projection-type image display device 100 may be provided with a wireless receiving unit to receive external video data through wireless communication to update the stored video data. A human sensor may be provided in a projection space to allow videos to be displayed only when a person comes closer. This enables an environment where the viewers can concentrate on viewing exhibits to be generate.

(2) Use Case 2

Figure 10:
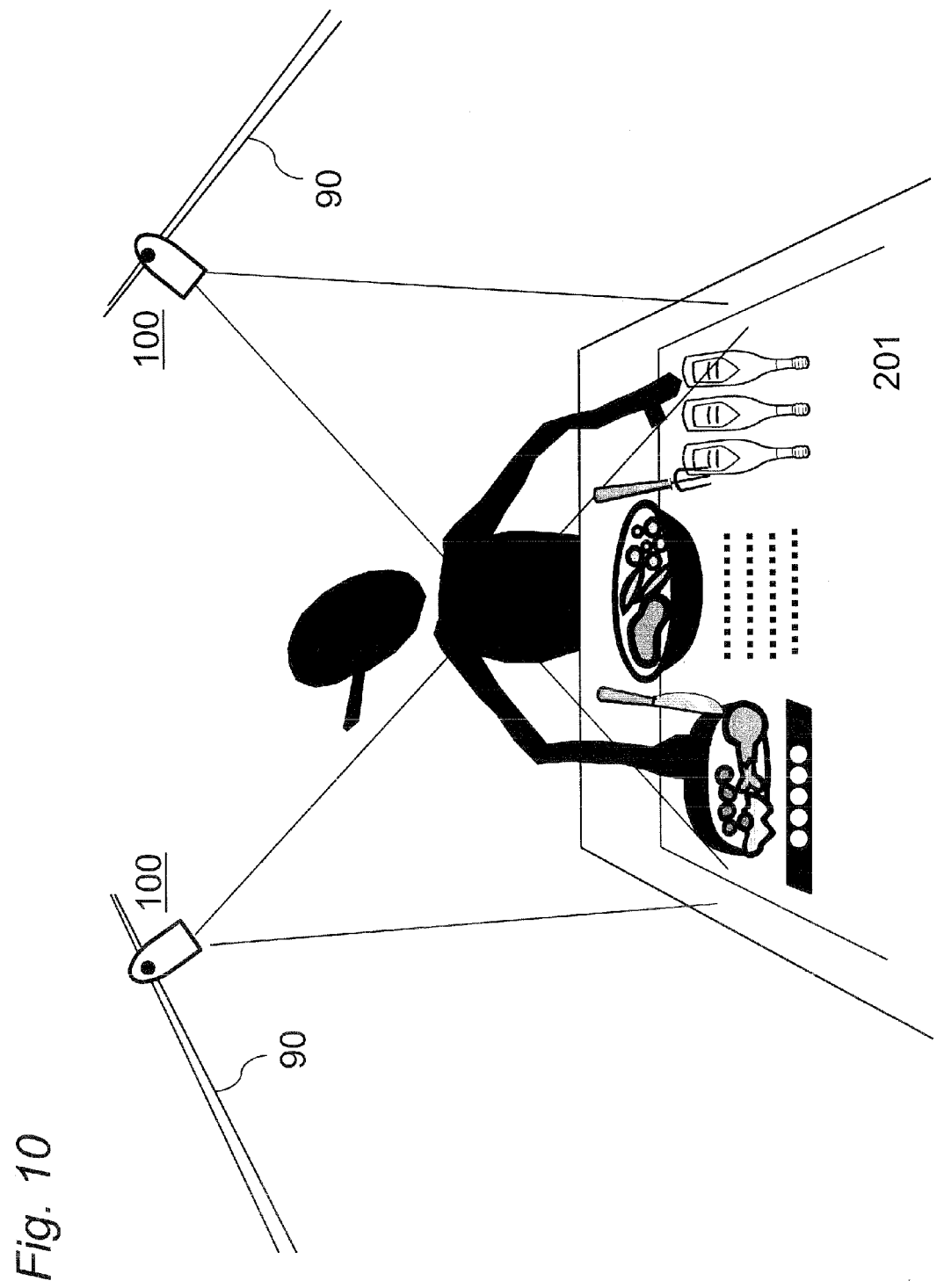
FIG. 10 is a schematic view explaining Use Case 2 of the projection-type image display device according to the present disclosure.

FIG. 10 is a view explaining another use case of the projection-type image display device 100.

In the example of FIG. 10, the projection-type image display device 100 projects a menu onto a surface 201 of a table in a restaurant. The projection-type image display device 100 is installed on the wiring duct rail 90 disposed on the ceiling of a passageway space in order that customers can less intercept light. A pressure sensor is disposed on the table surface 201 so that a customer's finger operation can be detected. The projection-type image display device 100 and the pressure sensor for each table are connected to a system controller so that the projection-type image display device 100 displays images input from the system controller. When detecting customer's action to start display, the system controller sends a menu screen to the projection-type image display device 100 for a target table, which in turn projects the menu screen onto the table surface. The customer operates the menu by his or her finger on the table surface 201, so that the customer can adjust display status (rotation, scaling, etc.), confirm the content, and place an order.

In response to the detected operation, the system controller corrects the displayed image or sends an order to a kitchen. After serving of dishes, the image may be continuously displayed or a mode may be switched to a illumination mode that irradiate illumination light without displaying images, thereby providing a spatial production ensuring relaxed dinner. Also at the time of this illumination mode, the operation interface is displayed to allow the customer to operate the brightness, color, shape, etc.

Upon operation of the menu, the readability may be lowered by shading of fingers or arms during the operation, and thus two projection-type image display devices 100 may be arranged for one table. The customer's operation on the menu may be a gesture operation using a three-dimensional sensor that is a combination of a visible light detecting sensor and an infrared sensor, instead of the finger operation by the pressure sensor on the table surface 201.

Images may be three-dimensionally displayed. This can enhance realistic sensation or sense of amusement. In this case, the system is configured from the two projection-type image display devices 100, the controller (e.g., PC), and 3D glasses. One of the two projection-type image display devices 100 displays an image for left eye, while the other displays an image for right eye. The controller controls the two projection-type image display devices 100 to display alternately an image output from each of the two display devices 100. The 3D glasses are configured to cause a user to view an image for left eye with viewer's left eye and to view an image for right eye with viewer's right eye, with polarization of light or shutter drive. The customer can watch 3D display by wearing the 3D glasses.

(3) Use Case 3

Figure 11:
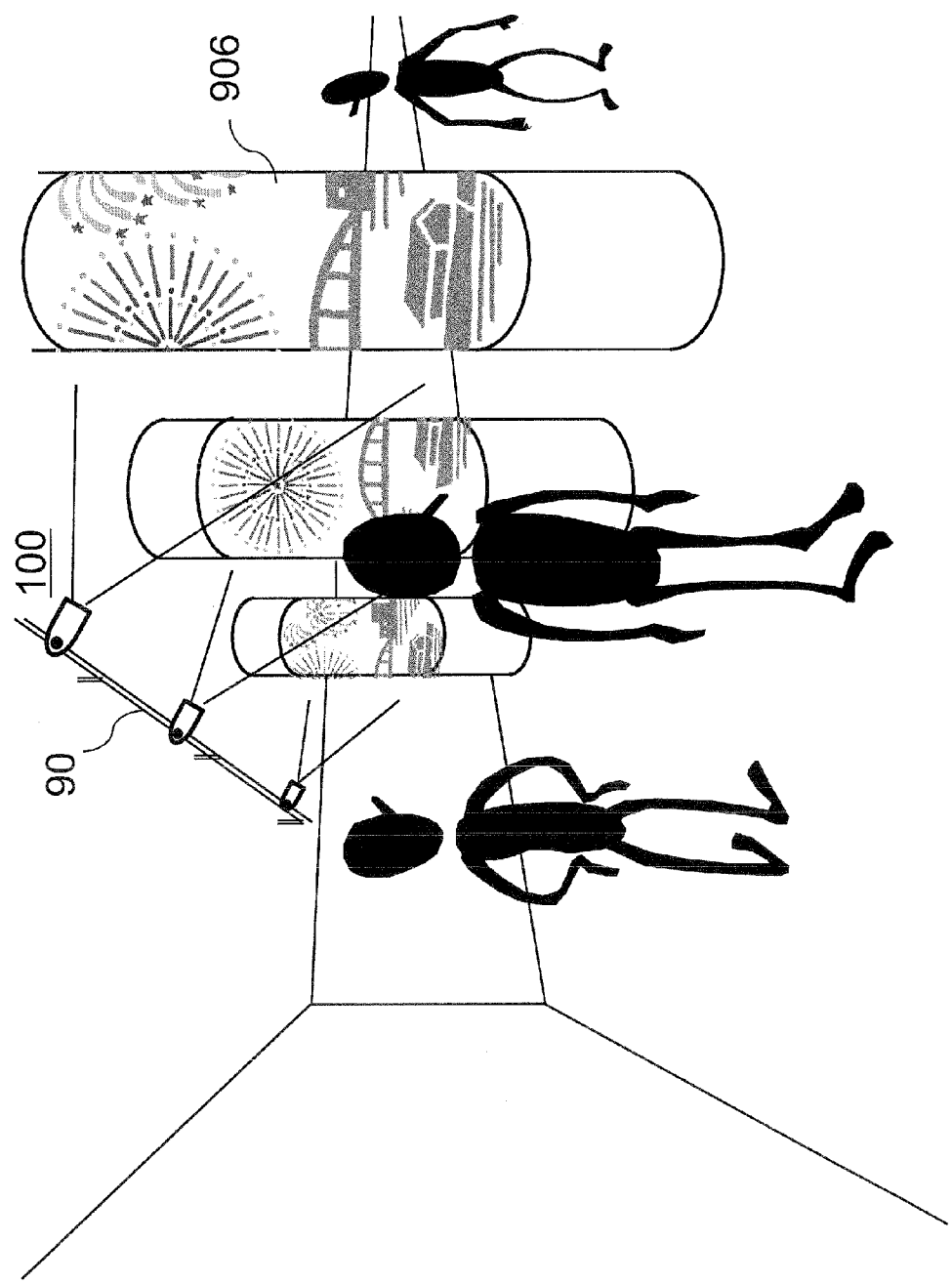
FIG. 11 is a schematic view explaining Use Case 3 of the projection-type image display device according to the present disclosure.

FIG. 11 is a view explaining a further use example of the projection-type image display device 300.

The projection-type image display device 100 projects an advertisement onto a cylindrical projection surface 906. In the projection space, a plurality of projection-type image display devices 100 are connected to the wiring duct rail 90 on the ceiling to project images onto the respective different projection surfaces 906. The plurality of projection images are displayed in conjunction with one another to provide extensive and stereoscopic display.

The plurality of projection-type image display devices 100 are connected to a single system controller (not shown). The plurality of projection-type image display devices 100 stores the same video data in their respective internal storage devices. The system controller sends display information (video synchronizing signal, image cutout position, display correction information, etc.) to the projection-type image display devices 100, based on position information and information of projection surface of the projection-type image display devices 100.

The projection-type image display device 100 performs an output timing adjustment, an image trimming, a trapezoid correction, and a curved surface projection correction on video data based on the received display information, to display an image onto the display surface. The corrections are applicable to any non-flat projection surfaces, not limited to the cylindrical projection surface. Therefore, the projection-type image display device 100 may project an image onto a surface of any object (e.g., a surface of a mannequin).

(4) Use Case 4

Figure 12:
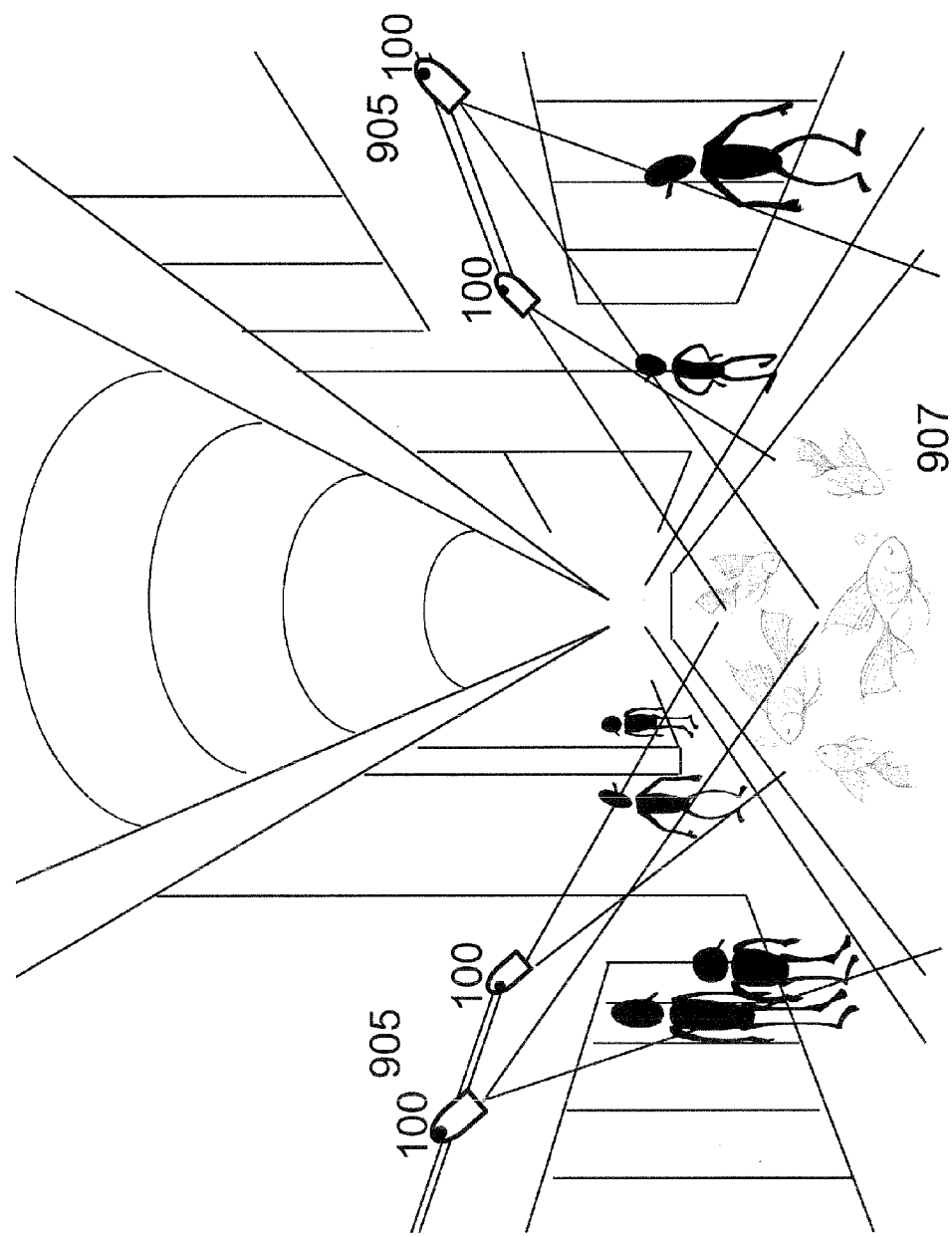
FIG. 12 is a schematic view explaining Use Case 4 of the projection-type image display device according to the present disclosure.

FIG. 12 is a schematic view explaining a use case of the projection-type image display device 100.

In the example of FIG. 12, the projection-type image display device 100 is placed on a wall surface 905 to project an image onto a floor surface 907. The image to be projected is generated by blending images projected from a plurality of projection-type image display devices 100, having a high resolution with a wide projection size.

The plurality of projection-type image display devices 100 are placed at a height so that an image light is not intercepted by passers. The projection-type image display device 100 performs 1) calculation of parameters for trapezoidal distortion correction, 2) adjustment of brightness and tone between the projection-type image display devices, and 3) adjustment of posture for blending projection, when it is placed. Specifically, the processes of 1) to 3) are carried out as follows.

1) A test image (e.g., cross-hatch image) for detecting a trapezoidal distortion is projected from each projection-type image display device 100. The user (adjuster) adjusts the distortion correction parameters while viewing the projected test image.

2) An entirely-white image is projected from each projection-type image display device 100. Using a spectral radiance meter, luminance and chromaticity of each image light is acquired. Parameters adjusting the RGB luminance balance and parameters adjusting the image signal range to eliminate differences among the projection-type image display devices 100 are obtained from the acquired values.

3) The projection angle is manually adjusted so as to partially overlap with projected images from the adjacent projection-type image display devices 100, with the trapezoidal distortion correction being applied.

The projection-type image display devices 100 are connected to a single system controller (not shown) that controls all of the projection-type image display devices 100. The system controller sends an image to be projected to each projection-type image display device 100. The projection-type image display device 100 performs trapezoidal distortion correction and brightness/color correction on the received image to project the corrected image.

The content of the image to be projected may be a single huge video that is obtained by blending images from all the projection-type image display devices 100 or an image that is obtained by blending part of images from all the projection-type image display devices. Age and gender of passers may be recognized by a camera system, so that the content may be changed according to the recognition result. An image tracking motion of a passer may be projected. Illumination light may be irradiated on the wall surface or the floor surface in addition to the projected image.

Other Embodiments

As described above, the first embodiment is described as an exemplification of the technique disclosed in the present application. However, the technique in the present disclosure is not limited thereto and is applicable to embodiments undergoing proper changes, permutations, additions, omissions, etc. A new embodiment may be provided by combining constituent elements described in the first embodiment. Thus, other embodiments will be exemplified below.

(A) In the above embodiment, the configuration is described which has the semiconductor laser elements emitting blue color light is used as an example of the light source. However, the present disclosure is not limited thereto. Semiconductor laser elements emitting IN laser light may be used, or semiconductor laser elements or LEDs emitting various color light may be used.

(B) Although the above embodiment describes the arrangement that lights from the plurality of semiconductor laser elements are incident on the dichroic mirror in s-polarization, it may be incident thereon in p-polarization in view of arrangement and dimensions of the entire optical configuration.

(C) Although the above embodiment describes the a reflection-type fluorescent wheel using an aluminum flat plate, a transmission-type fluorescent wheel using, for example, a glass plate formed with a reflection film may be used in view of arrangement and dimensions of the entire optical configuration.

(D) Although in the above embodiment the configuration having a pair of fly-eye lenses used as an integrator for uniforming illuminance distribution, a straight rod or a tapered rod may be used for the integrator.

(E) The projection-type image display device may further include, in the second housing 102, a sending unit that sends a light signal (e.g., an infrared signal) containing audio, video, or other information. By providing the sending unit in the second housing 102 rarely undergoing a change of direction, it becomes possible to securely send the light signal to a destination.

Figure 13:
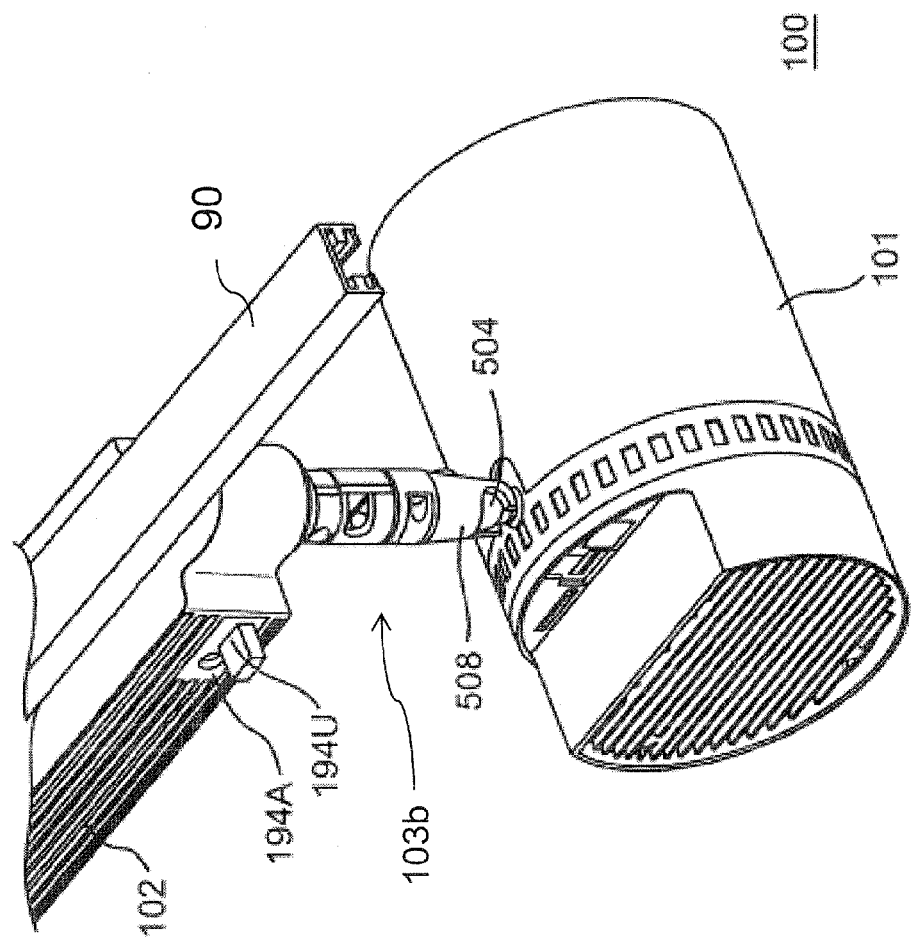
FIG. 13 is a perspective view of another example of a projection-type image display device according to the present disclosure.

(F) Although in the above embodiment the configuration of the joint unit supporting the first housing 101 is exemplarily described as shown in FIGS. 1 and 2, the configuration of the joint unit is not limited thereto. For example, as shown in FIG. 13, a ball joint may be used for the joint unit. A ball joint unit 103b shown in FIG. 13 includes a ball shaft 504 having a spherical end, and a shaft holder 508 holding the spherical end. The spherical end of the ball shaft 504 slidably turns in a hollow portion of the shaft holder 508, so that the direction of the first housing 101 can be freely altered. The aforementioned idea is also applicable to a configuration of the projection-type image display device having such a joint unit.

(G) Although in the above embodiment, the infrared signal is used as the remote control signal, the remote control signal is not limited to the infrared signal. For example, a radio signal may be used and the second housing 102 may include a receiving unit for receiving the radio signal, instead of the remote-control signal receiver. In this case as well, due to low frequency of change in the position and direction of the receiving unit, the radio signal can advantageously be received stably. Although the idea of the present disclosure is especially effective to a case of using, as the remote control signal, infrared rays or visible light having a strong straightness out of all electromagnetic waves, but radio signal may be utilized.

As described above, the embodiments have been described as exemplifications of the technique in the present disclosure. To this end, the accompanying drawings and the detailed description have been provided.

Therefore, among the constituent elements described in the accompanying drawings and the detailed description, there may be included not only essential constituent elements to solve the problem but also constituent elements not essential to solve the problem. For this reason, immediately from the fact that their unessential constituent elements are described in the accompanying drawings and the detailed description, it should not be identified that their unessential constituent elements are essential.

Since the above embodiments are for the exemplifications of the technique in the present disclosure, various changes, permutations, additions, omissions, etc., may be made in the scope of the patent claims or in its equivalent scope.

INDUSTRIAL APPLICABILITY

The present disclosure is applicable to a projection type image display device such as a projector.

The invention claimed is:

1. A projection-type image display device comprising:
a first housing that houses a light source unit configured to emit light, an image generating unit configured to modulate the light from the light source unit according to a video input signal to generate image light, and a projecting unit configured to project the image light generated by the image generating unit;
a second housing that includes a remote-control signal receiver for receiving an operational signal indicative of an instruction by a user from a remote controller; and
a joint unit for connecting the first housing to the second housing to allow the first housing to freely turn in several directions.

2. The projection-type image display device according to claim 1, further comprising:
an LED configured to inform the user of an internal state of the projection-type image display device.

3. The projection-type image display device according to claim 2, wherein
the LED is arranged over a bottom surface and another surface adjoining the bottom surface of the second housing.

4. The projection-type image display device according to claim 3, wherein the LED and the remote-control signal receiver are arranged on an end of the second housing opposite to another end of the second housing on which the joint unit is disposed.

5. The projection-type image display device according to claim 1, wherein the second housing has, on its lateral surface, an opening for exhaust.

6. The projection-type image display device according to claim 1, wherein the second housing houses a power-supply unit configured to supply electric power to the light source unit and the image generating unit.

7. The projection-type image display device according to claim 1, wherein the joint unit includes a ball shaft having a spherical end, and a shaft holder holding the spherical end to allow the spherical end to slidably turn in a hollow portion of the shaft holder.

8. The projection-type image display device according to claim 1, wherein the joint unit is rotatable around three mutually independent axes.

* * * * *